Patented Nov. 14, 1922.

1,435,780

UNITED STATES PATENT OFFICE.

WILLIAM EDWARD WYATT, OF TORONTO, ONTARIO, CANADA.

SOLDERING FLUX.

No Drawing. Application filed January 29, 1921. Serial No. 441,103.

*To all whom it may concern:*

Be it known that I, WILLIAM EDWARD WYATT, a subject of His Britannic Majesty, George the Fifth, residing at 233 Evelyn Avenue, in the city of Toronto, in the county of York, in the Province of Ontario, and in the Dominion of Canada, have invented a certain new and useful Soldering Flux, of which the following is a specification.

The aforesaid soldering flux consists of the following ingredients, combined in the proportion hereinafter stated, namely:—

Water substantially pure _____ 7 imperial pints.
Zinc chloride _____ 4¼ pounds.
Ammonia chloride __ 11 ounces.
Mercury _____ 2 ounces.
Muriatic acid _____ 2 drops.

These ingredients are to be thoroughly mingled by agitation.

*Purposes.*

The purpose of this composition of matter is to assist in the soldering and amalgamating, and effecting a complete amalgamation of metals of the same or different natures.

*Uses.*

It can be used in all cases of amalgamating by soldering with ordinary solder, pure silver, or pure gold, metals of the same kind, or metals of a different nature.

In using this liquid, the surfaces of the metals to be amalgamated, are to be cleaned from dirt, rust or waste matter; the cleaned surfaces moistened or wet with the liquid, and then by placing the metals together, in the form to be joined or amalgamated, ordinary solder, pure silver, or pure gold, is used and melted into position by the use of the ordinary soldering bolt or iron, the liquid cooperating with the melted solder, silver or gold, to form a complete amalgamation between the metals to be joined.

Having thus fully described my said invention, what I claim as new and desire to secure by Letters Patent, is:

1. A soldering flux comprising oxidization preventing agent, an acid and mercury.

2. A soldering flux comprising hydrochloric acid, mercury ammonia chloride and water.

In witness whereof, I have hereunto set my hand at the city of Toronto, in the county of York, and Province of Ontario, this twenty-sixth day of January, A. D. nineteen hundred and twenty-one.

WILLIAM EDWARD WYATT.

Witnesses:
B. BELCHER,
J. E. VEAL.